(12) United States Patent
Fujinami et al.

(10) Patent No.: US 6,259,359 B1
(45) Date of Patent: Jul. 10, 2001

(54) REAR MONITORING SYSTEM FOR VEHICLE

(75) Inventors: Kazutomo Fujinami; Naoto Ishikawa; Keiki Okamoto, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/544,298

(22) Filed: Apr. 6, 2000

(30) Foreign Application Priority Data

Apr. 6, 1999 (JP) .................................................. 11-098591

(51) Int. Cl.⁷ .................................................. B60Q 1/100

(52) U.S. Cl. ........................... 340/435; 340/436; 340/903; 348/148

(58) Field of Search ..................................... 340/435, 436, 340/902, 903, 904, 937, 938; 180/167, 168, 169; 348/148

(56) References Cited

U.S. PATENT DOCUMENTS

| 4,384,770 | * | 5/1983 | Tokutomi et al. | 396/111 |
| 4,690,549 | * | 9/1987 | Nakada | 356/4.04 |
| 5,612,686 | * | 3/1997 | Takano et al. | 340/903 |
| 5,874,904 | * | 2/1999 | Hirabayashi et al. | 340/903 |
| 5,987,174 | * | 11/1999 | Nakamura et al. | 382/199 |
| 6,053,268 | * | 4/2000 | Yamada | 180/167 |

* cited by examiner

*Primary Examiner*—Van T. Trieu
(74) *Attorney, Agent, or Firm*—Armstrong, Westerman, Hattori, McLeland & Naughton, LLP

(57) ABSTRACT

In a rear monitoring apparatus for a vehicle, a prism (2) enlarges the lower portion of the range which can be picked up by a camera (1), and a usage means uses the lower portion. In this configuration, the image in the vicinity of one's own vehicle can be picked up without impeding the detection of the optical flows generated from another vehicle approaching from a far distance, and can be used for the purpose different from the detection of the optical flows.

9 Claims, 8 Drawing Sheets

REAR MONITORING SYSTEM FOR VEHICLE

BACKGROUND OF THE INVENTION

1. Field of the Invention

The present invention relates to a rear monitoring system for a vehicle, and more particularly to a rear monitoring system for detecting another vehicle approaching one's own vehicle during vehicle running using an image picked up by a vehicle-loaded camera and giving a warning to a driver. Incidentally, it should be noted that the rear includes a rear-side or a diagonal rear.

2. Description of the Related Art

As an example of such a rear monitoring system for a vehicle, a previously known technique is to detect another vehicle approaching one's own vehicle using optical flows from another vehicle. Now referring to FIGS. 9A–9D, an explanation will be given of a conventional rear monitoring system for a vehicle.

FIGS. 9A–9C are views for explaining a change in a rear background image acquired by a camera 1. FIG. 9A shows a status inclusive of one's own vehicle. FIG. 9B shows an image picked up by the camera 1 at timing t in an environment of one's own vehicle. FIG. 9C shows an image picked up at timing t+Δt.

Now it is assumed that one's own vehicle is running straight on a flat road. The road sign and building residing in the rear of one's own vehicle in FIG. 9A are observed as images shown in FIGS. 9B and 9C at timings t and t+Δt, respectively. Coupling the corresponding points in these two images provides speed vectors as shown in FIG. 10D. The are referred to as "optical flows". Where a following vehicle approaches, the directions of the vectors in the optical flows in FIG. 10D are contrary. Using the optical flows, the conventional environment monitoring system monitors the relationship between one's own vehicle and the following vehicle or another vehicle running on an adjacent lane to detect the other vehicle approaching one's own vehicle, thereby giving a warning to a driver.

Meanwhile, when the vehicle is backed up or reversed, there is a range out of a field of view of a driver even if the field of view in the rear is supplemented with a fender mirror or rear view mirror. Particularly, a large-scale vehicle such as a truck and bus has a large blind spot in a rear or rear-side direction from a vehicle driver. In order to obviate such an inconvenience, it was proposed to assure a rear-side field of view using a rear-side road image taken from a camera installed on the back of the large-scale bus and monitor the rear-side direction while the vehicle is reversed.

While the vehicle is reversed, the camera used to monitor the rear-side direction must pick up the range within several meters from the back in order to confirm an obstacle in the vicinity of the vehicle. On the other hand, while the vehicle is forwarded, the camera must pick up the place far from the back of the vehicle by several meters or more in order to detect optical flows generated from the vehicle which follows one's own vehicle or runs on an adjacent vehicle lane and approach from the long distance.

In this way, the camera used to monitor the rear direction while the vehicle runs forward and backward has different ranges to be picked up. Therefore, a single camera could not be used to monitor the rear-side direction both while the vehicle runs forward and backward. In order to obviate such an inconvenience, it was proposed to use a wide-angle lens capable of picking up the place near to and far from one's own vehicle. However, this proposal lowers the resolution of the entire road image so that detection of optical flows is made difficult.

A prior art of detecting optical flows detects the white lines of one's own lane on a straight road, defines, as an FOE point, the crossing point of extended lines of the detected white lines and makes correlation processing radially from the FOE to acquire optical flows, thereby realizing the image processing at a high speed. However, the road image picked up by the camera in the night time does not have high contrast so that it is difficult to detect the white lines. In order to obviate such an inconvenience, it can be proposed to detect the white lines in the vicinity of the vehicle by illuminating the rear of one's own vehicle with light to a degree that safe running of the following vehicle is not hindered, and to estimate the white lines on the road image.

However, since the camera used to monitor the rear-side direction while one's own vehicle runs forward picks up the far place, the single camera cannot be used for the rear-side monitoring and detection of the white lines in the vicinity of the vehicle while one's own vehicle runs forwards. In this case also, it can be proposed to use a wide-angle lens capable of picking up the place near to and far from one's own vehicle. However, this proposal lowers the resolution of the entire road image so that detection of optical flows is made difficult.

SUMMARY OF THE INVENTION

An object of the present invention is to provide a rear monitoring system for a vehicle which can pick up an image in the vicinity of one's own vehicle without hindering detection of optical flows generated from another vehicle approaching from a distant place can use the picked-up image in the vicinity of the vehicle for the other purpose than detection of optical flows.

In order to attain the above object, in accordance with the present invention, in accordance with the present invention, as shown in a basic structural diagram of FIG. 1, there is provided a rear monitoring apparatus for a vehicle comprising:

an image pick-up means 1, loaded on a vehicle, for picking up a rear of the vehicle to provide an image;

means 4a-1 for detecting, as an optical flow, movement of the corresponding points of two images picked up at two timings by the image pick-up means;

danger judging means 4a-2 for detecting the other vehicle approaching one's own vehicle running in the vicinity of one's own vehicle on the basis of a value of the optical flow from the other vehicle;

an image pick-up range enlarging means 2 for enlarging a lower portion of a range which can be picked up by the image pick-up means; and usage means 20 for using the image corresponding to the lower portion for a different purpose from detection of the optical flow.

In this configuration, the image pick-up range enlarging means 2 for enlarging a lower portion of a range which can be picked up by the image pick-up means; and the usage means 20 uses the image corresponding to the lower portion. Therefore, by enlarging the lower portion of the range which can be picked up by the image pick-up means, the resolution of the image of the upper portion of the range which can be picked up will not be lowered. The image in the vicinity of the vehicle corresponding to the enlarged lower portion can be used for the other purpose than detection of the optical flow.

Preferably, the usage means 20 includes a display means 6b for displaying the image picked up by the image pick-up means.

In this configuration, since the usage means 20 includes a display means 6b for displaying the image picked up by the image pick-up means, the rear monitoring during vehicle reversing can be performed by confirming the image in the vicinity of the vehicle corresponding to the lower portion enlarged by the image pick-up enlarging means.

Preferably, the rear monitoring apparatus further comprises vehicle reversing detecting means 5 for detecting reversing of one's own vehicle, and the display means displays the image picked up by the image pick-up means when reversing of the vehicle is detected by the vehicle reversing detecting means.

In this configuration, when the reversing of the vehicle is detected by the vehicle reversing detecting means 5, the display means 6b automatically displays the image picked up by the image pick-up means 6b. Therefore, the user is not required to turn on/off the display means 6b using the manual switch 6b.

Preferably, the optical flow detecting means detects the optical flow when reversing of the vehicle is not detected by the vehicle reversing detecting means.

In this configuration, when reversing of the vehicle is not detected, the optical flow detecting means 4a-1 automatically detects the optical flow. Therefore, during forwarding or before starting, the user is not required to turn on/off the optical flow detecting means 4a-1.

Preferably, the image obtained by the image pick-up means is composed of a first image portion corresponding to an upper part of the range which can be picked up by the image pick-up means and a second image portion corresponding to a lower portion thereof which is enlarged by the image pick-up enlarging means, and the display means displays only the second image portion.

Preferably, the image obtained by the image pick-up means is composed of a first image portion corresponding to an upper part of the range which can be picked up by the image pick-up means and a second image portion corresponding to a lower portion thereof which is enlarged by the image pick-up enlarging means, and the optical flow detecting means detects the optical flow from the first image portion.

In this configuration, since the optical flow is detected on only the first image portion DG and the image processing for the second image portion CG can be omitted, the image processing for detecting the optical flow can be minimized.

Preferably, the usage portion comprises:

white line detecting means for detecting a pair of white lines located on both sides of one's own vehicle by processing the first image portion, a lower FOE setting means for setting a crossing point of extended lines of the white lines detected by the white line detecting means as a first FOE (focus of extension) of the first image portion, and an upper FOE setting means for setting a second FOE of the second image portion on the basis of the first image potion, and the optical flow detecting means detects the optical flow from the second image portion by using the first FOE set by the upper FOE setting means.

In this configuration, when the image of the white lines on the first image portion is difficult to pick up in a dark environment (in the night time and within a tunnel), in order to pick up the white lines on the second image portion, the vicinity of the rear end of the vehicle has only to be illuminated with light.

Preferably, the upper FOE setting means has means for storing a displacement between the first FOE and the second FOE, and sets the second FOE by shifting the first FOE by the displacement.

In this configuration, it is not necessary to compute the second FOE from the angle formed by the white lines detected for the lower image pick-up range.

Preferably, the image pick-up range enlarging means is a prism which includes a lower portion which becomes thick downward so that the lower portion of the range which can be picked up by the image pick-up means is enlarged, and an upper portion integral to the lower portion and having a uniform thickness.

In this configuration, the prism, which includes the upper portion having a uniform thickness and the lower portion having a thickness becoming larger downward with a constant prism apex so that a change in the refractive index of the light incident from the upper portion of the prism is decreased, thereby reducing the blind spot at the boundary between the upper portion and the lower portion of the prism.

The above and other objects and features of the present invention will be more apparent from the following description taken in conjunction with the accompanying drawings.

DESCRIPTION OF THE PREFERRED EMBODIMENTS

Figure 1:
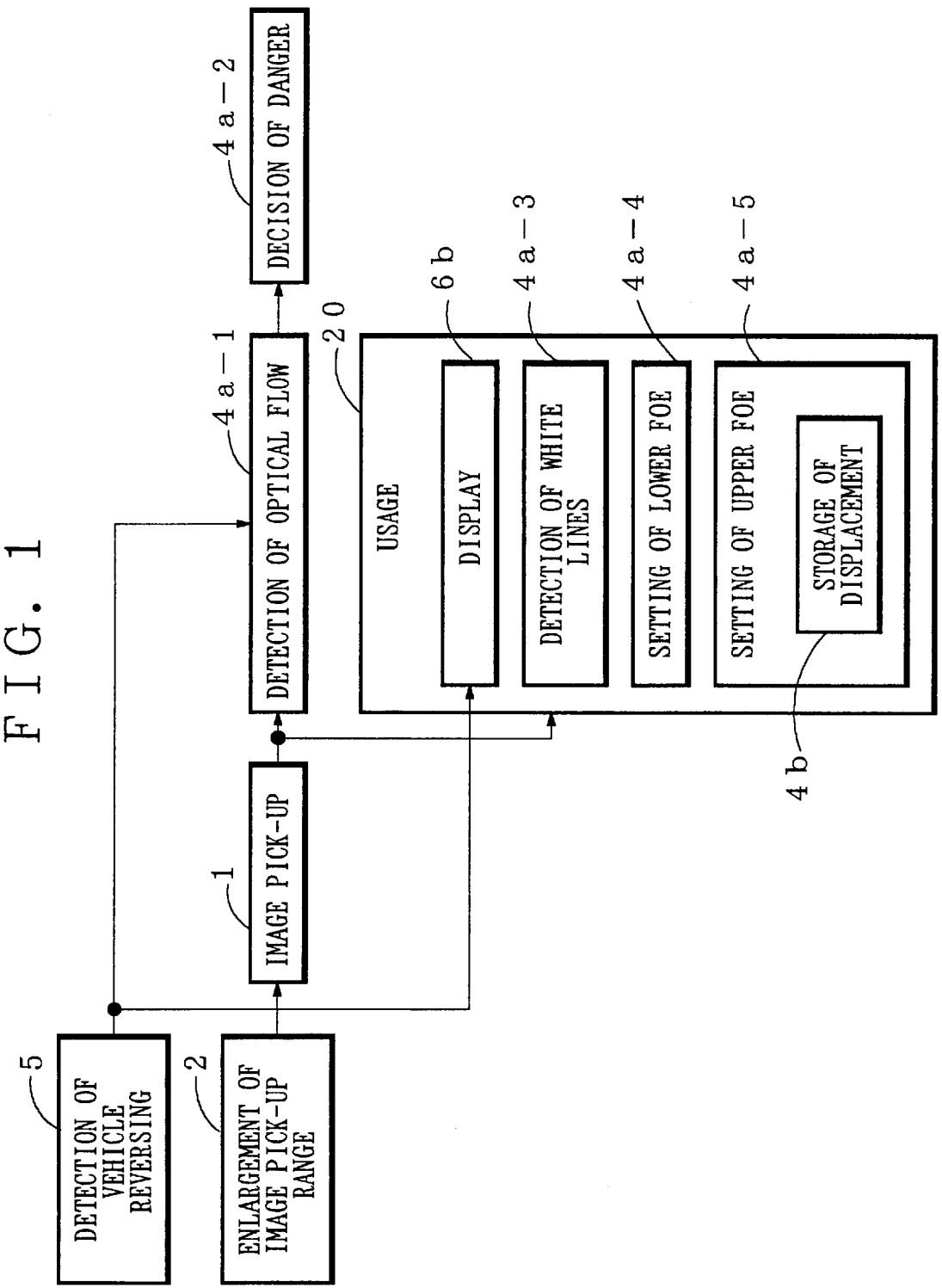
FIG. 1 is a schematic basic diagram of a rear monitoring system for a vehicle according to the present invention.

Now referring to the drawings, an explanation will be given of various embodiments of the present invention.

Figure 2:
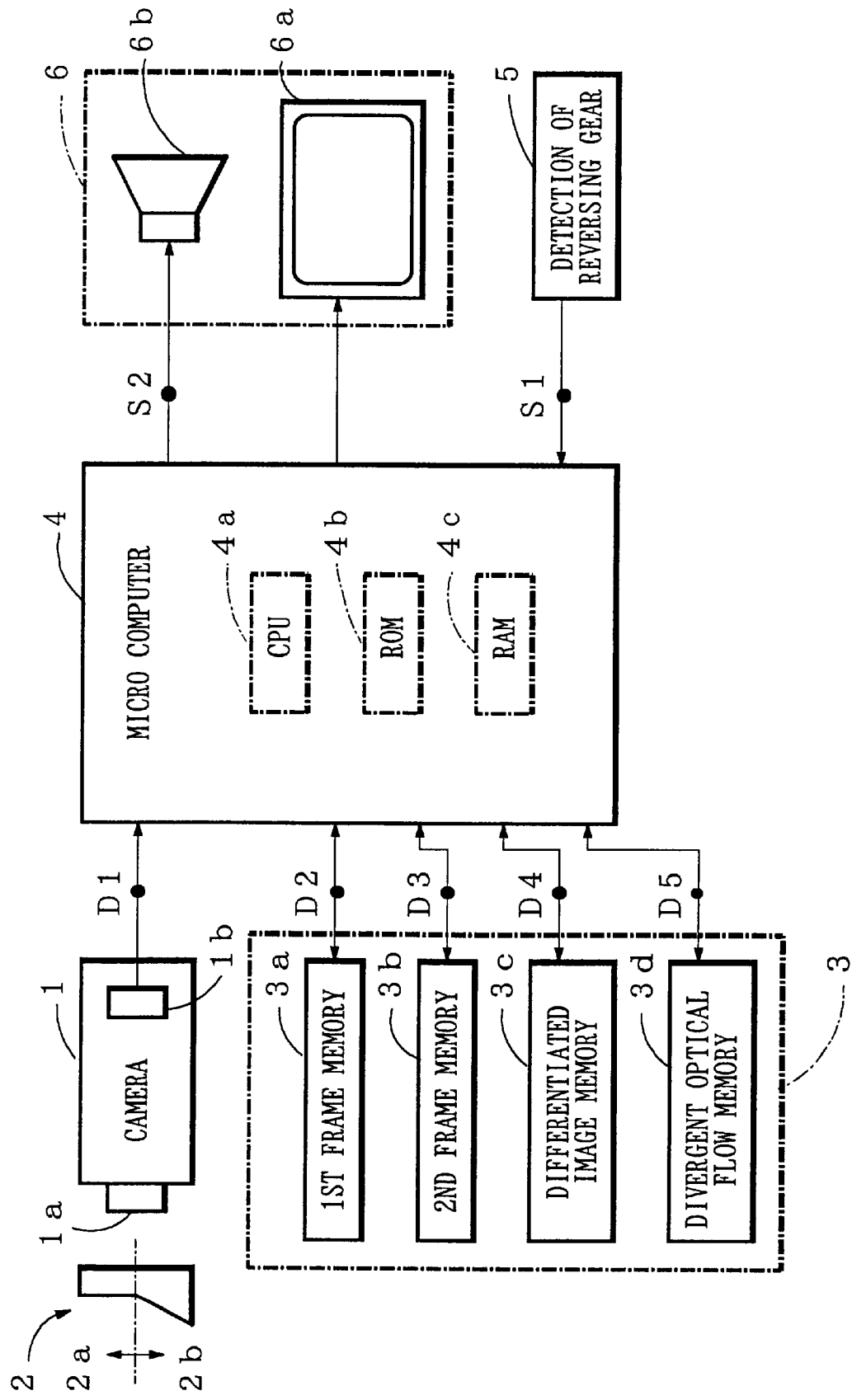
FIG. 2 is a block diagram of an embodiment of the rear system according to the present invention.

FIG. 2 is a block diagram of an embodiment of the environment monitoring system according to the present invention. As shown in FIG. 2, a camera 1 is loaded on a vehicle at a position where the rear of a vehicle can be picked up, and focuses an image incident through a lens 1a on an image plane 1b.

Figure 3:
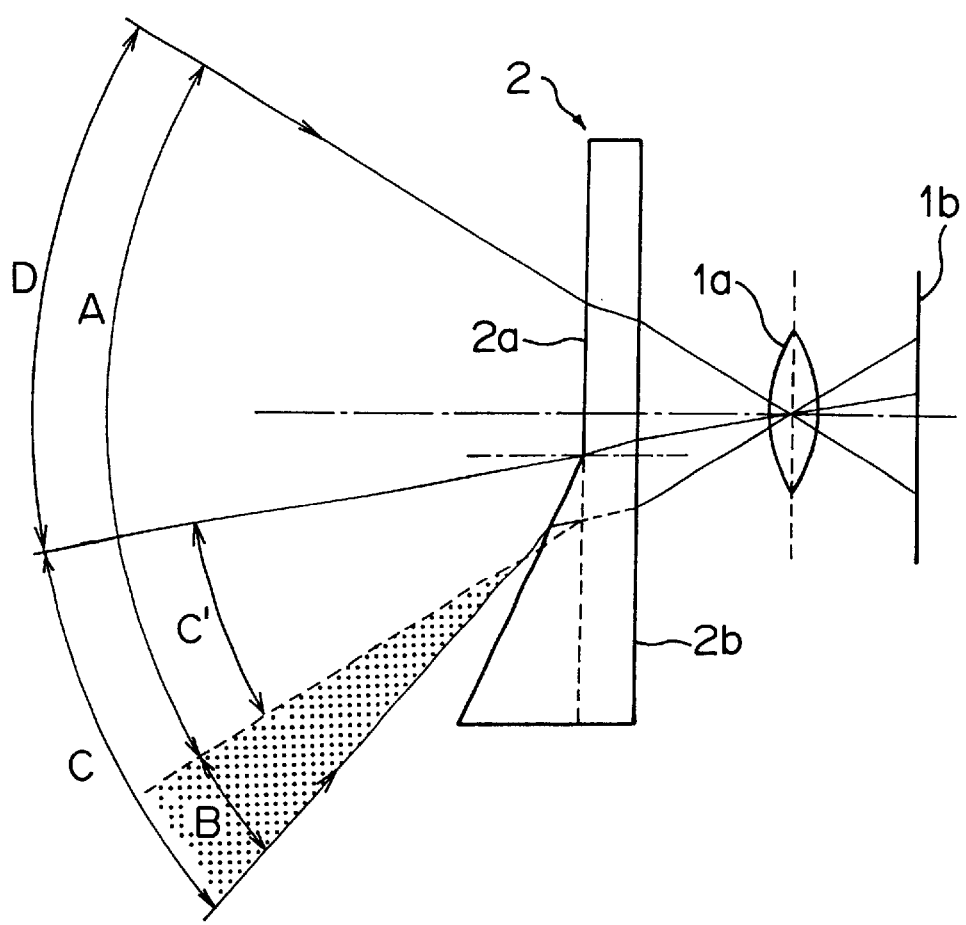
FIG. 3 is a view for explaining the shape and operation of a prism constituting a rear monitoring system according to the present invention shown in FIG. 2.

A prism 2, which serves as a means for enlarging the range to be picked up, includes an upper portion 2a having a uniform thickness and a lower portion 2b whose thickness becomes thick downward. As seen from FIG. 3, where the prism 2 is not located in front of the lens 1a, a pick-up range A is defined by the angle of view of the lens 1a. When the prism 2 is located in front of the lens 1a, the image in a pick-up range B outside the pick-up range A is incident so that the lower range C' which can be picked up by the camera 1 is enlarged to a lower portion C. For the purpose of confirming the rear when the vehicle is reversed, the prism 2 is located in front of the lens 1a so that the lower portion C incident through the lower portion 2b is within a range of several meters from the vehicle.

A storage section 3 includes a first frame memory 3a, a second frame memory 3b, a differentiated frame memory 3c and a divergent optical flow memory 3d. The first and the second frame memory 2a and 2b temporarily store, as D2 and D3, the pixels in a m- by n-matrix (e.g. 512×512 pixels and with the luminance in 0–255 tones) converted from the image data D1 imaged on the image plane 1b of the camera 1, and supplies them to a microcomputer 3. The first frame memory 3a and second frame memory 3b successively store the m×n pixel data D2 and D3 converted from the image picked up at an established period $\Delta t$ in such an alternate manner that it is stored in the first frame memory 3a at timing t, in the second frame memory 2b at timing t+$\Delta t$ . . . .

The differentiated image memory 3c stores the differentiated image data D4 created by differentiating the pixel data D2 and D3. The divergent optical flow memory 3d stores optical flow data D5 in a divergent direction and supplies them to the microcomputer 4.

The microcomputer 4 includes a CPU 4a which operates in accordance with a control program, an ROM 4b for storing the control program for the CPU 4a and prescribed values, and RAM 4c for temporarily storing data necessary to perform computation of the CPU 4a.

A warning generating section 6 has a display 6a serving as a displaying means 6a and a speaker 6b. The display 6a displays the image picked up by the camera 1. In addition, where it is decided that there is danger of collision or contact with the other vehicle which has approached one's own vehicle, the display 6a visually indicates the danger for the driver by displaying the pertinent message. The display 6a may be a display used for a television receiver.

On the basis of the sound signal S2 produced from the microcomputer 3 where it is decided that there is danger of collision or contact with another vehicle, the speaker 6b indicates warning by a sound, i.e. generates audio guidance or warning on each of these facts.

An explanation will be given of the operation of a rear monitoring apparatus having the configuration described above. First, when a reversing signal S1 is not issued from a reverse gear sensor 5, the CPU 4a automatically starts to detect the optical flows. While the vehicle is not reversed, i.e. when it is desired that the rear monitoring during forward running or before starting is made, the CPU4a starts to detect the optical flows. This saves time and labor of turning on/off detection of the optical flows by a manual switch.

Figure 4:
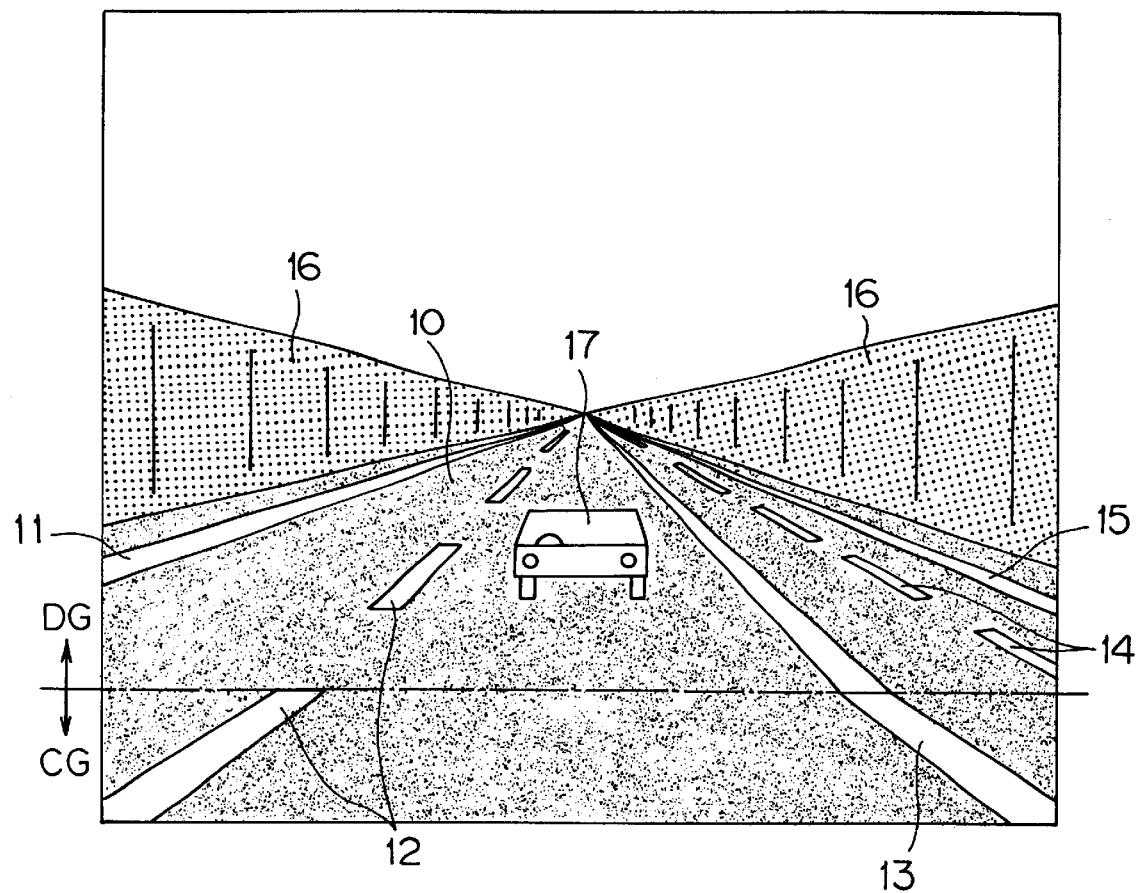
FIG. 4 is a view showing the image picked up by a camera.

The detection of optical flows will be carried out in the following procedure. First, the camera 1 supplies the picked-up image as shown in FIG. 4 to the microcomputer 4 as picked-up image data D1. The picked-up image includes a first image portion DG corresponding to an upper portion D incident through the upper portion 2a of the prism 2 and a second image portion CG corresponding to a lower portion C incident through the lower portion 2b of the prism 2. The second image portion CG is compressed vertically. The picked-up image includes a road 10, white lines painted on the road 10, side walls 16 provided uprightly on both sides of the road which disappear at the center position in a horizontal line on an image screen, and an approaching vehicle 17.

The CPU 4a converts the picked-up data D1 at timing t taken from the camera 1 into the pixel data 2 with 512×512 pixels and with the luminance in 0–255 tones and supplies them to the first frame memory 2a. The first frame memory 2a temporarily stores the pixel data D2 to be readable all the time by the microcomputer 4. After a prescribed period $\Delta t$, the microcomputer 4 supplies the pixel data D3 of the image picked up at timing t+$\Delta t$ to the second frame memory 2b. Thus, the first frame memory 3a and second frame memory 3b successively store the pixel data D2 and D3 of the image picked up at prescribed intervals $\Delta t$.

Figure 5:
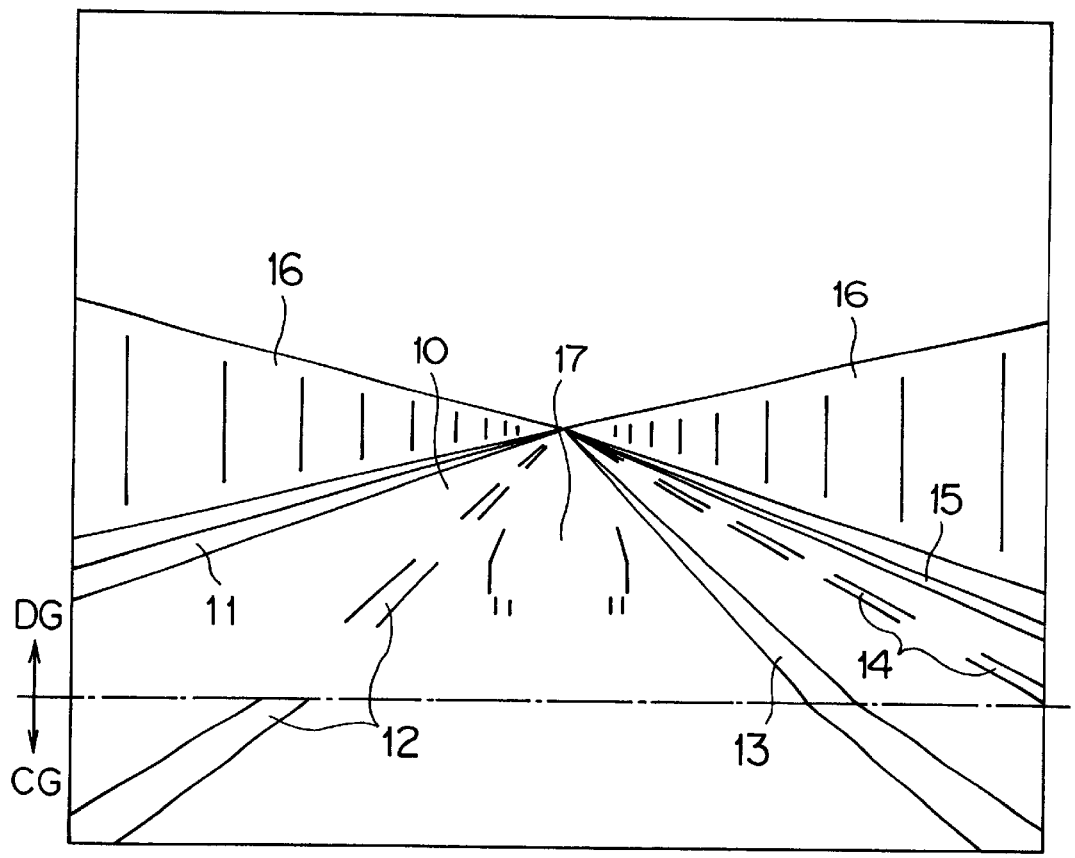
FIG. 5 is a view showing the differentiated image (or edge image) created by differentiation of the picked-up image.

Through the processing by the CPU 4a, the pixel data D2 having the luminance of Im,n at the pixel at m-th row and n-th column are scanned horizontally in FIG. 4 so that a difference in luminance (Im,n+1−Im,n) between the pertinent pixel and an adjacent pixel is acquired. If it is larger than a prescribed value, luminance Imn=1 is taken. If it is smaller than the prescribed value, luminance Imn=0 is taken. On such an assumption, a differentiated image (edge image) as shown in FIG. 5 which represents the image at only the edges of the picked-up image is created. The differentiated image thus created is supplied as differentiated image data D4 to a differentiated image memory 2c.

Figure 6:
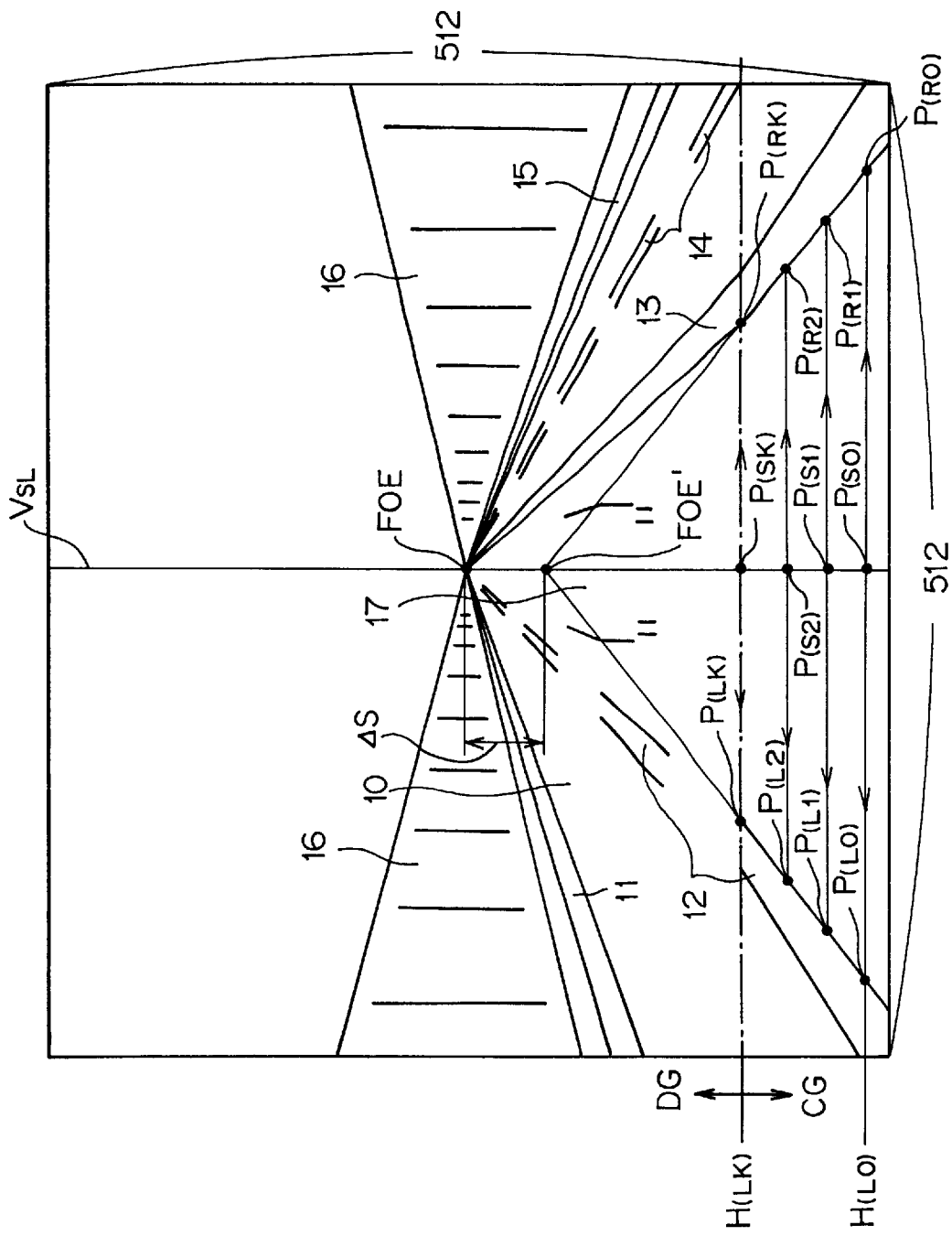
FIG. 6 is a view for explaining the operation of detection of white lines.

A reference line VSL as shown in FIG. 6 is set for the differentiated image. The reference line VSL is set to run vertically on the differentiated image at a center position in the horizontal direction of the differentiated image. Namely, the reference line is set at a center in the horizontal direction of the lane on which one's own vehicle runs and sectioned by the white lines 12 and 13.

After the reference line VSL has been set, searching is carried out of the edge points of a pair of white lines 12 and 13 which are located on both sides of one's own lane. Searching the edge points of the white lines 22 and 23 is carried out within only the second image portion CG, i.e., from a horizontal line H (L0) located at the bottom of the screen shown in FIG. 6 to a horizontal line H (LK). First, the edge points are searched from the lowermost end on the reference line VSL toward both ends in the horizontal direction. Thus, the edge points P (L0) of the white line 12 and P (R0) of the white line 13 are acquired which are located on the left and right side of the reference line VSL, respectively.

Next, the edge points are searched from the point PS1 which is located at the second point from the lowermost end, toward both ends in the horizontal direction. Thus, the edge points P (L1) of the white line 12 and P (R1) of the white line 13 are acquired which are located on the left and right side of the reference line VSL, respectively.

Such processing will be carried out successively upward to acquire the edge points on the differentiated image. As a result, on the second image portion CG, only the edge points of the pair of white lines 12 and 13 on both sides on the lane on which one's own vehicle runs can be extracted. Using the extracted edge points, approximated lines are created through the minimum square law, and detected as the white lines 12 and 13. The CPU 4a serves as a means for setting a lower FOE (Focus of Extension) so that the approximated lines of the detected white lines 12 and 13 are extended to set the crossing point as a FOE' on the second image portion CG. As described above, since the white lines 12 and 13 on the second image portion CG are compressed vertically, the crossing point FOE' of the extended lines 12 and 13 of the second image portion CG is displaced from the FOE on the first image portion DG. As seen from FIG. 6, since the vertical displacement ΔS between FOE' and FOE is defined according to the location of the camera, shape of the prism, etc., it can be previously stored in the ROM 4b. In this case, the CPU 4a serves as an upper FOE setting means. Namely, the FOE' set in the manner described above is shifted upward by the displacement ΔS so that the FOE on the first image portion DG can be set.

Likewise, with respect to the pixel data D3 of the image picked up after Δt, on the second image portion CG, the pair of white lines 12 and 13 are detected which are located on both sides of one's own lane. The crossing point of the extended lines of the detected white lines 12 and 13 is set as FOE'. The FOE' is shifted upward by the displacement ΔS stored in the ROM 4b to set FOE. For this reason, when for example, the image of the white lines on the first image portion DC is difficult to pick up in a dark environment (in the night time and within a tunnel), in order to pick up the white lines on the second image portion CG, the vicinity of the rear end of the vehicle has only to be illuminated with light. Therefore, a small size and inexpensive light can be used for this purpose. Further, since the light is projected downward, glare for the following vehicle can be reduced.

Figure 7A:
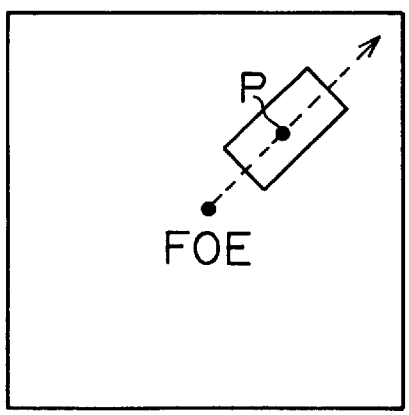
FIGS. 7A and 7B are views for explaining the operation of detecting optical flows.
Figure 7B:
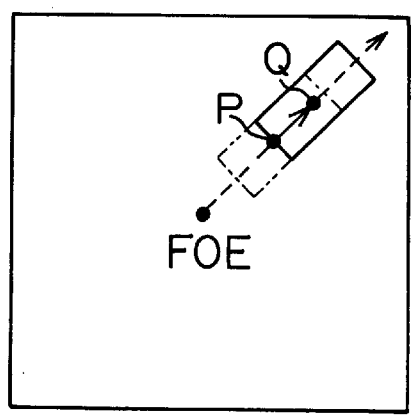

Once the FOE has been set, the CPU 4a acquires the optical flows in order to detect the danger for the other vehicle running on an adjacent lane or the following vehicle on the same lane. Now referring to FIG. 7, an explanation will be given of the procedure of acquiring the optical flows. First, the pixel data D2 is captured from the first frame memory 2a. On the image picked up at timing t, a rectangular window is set in a direction extending radially from the FOE set in the manner described above to a certain point at issue (FIG. 7A). Next, the pixel data D3 is captured from the second frame memory 2b. On the image picked up at timing t+Δt, while the window is shifted one point by one point in the direction extending radially from the FOE, the absolute value of a luminance difference is acquired between each of the pixels constituting the window at timing t and the corresponding one at timing t+Δt. Namely, the absolute value is acquired between the pixel P at timing t (FIG. 7A) and the corresponding pixel Q at timing t+Δt (FIG. 7B).

The shifting amount of the window when the sum of the luminance differences thus acquired is minimum is taken as the optical flow of the point at issue.

The above processing is repeated for all the points in the first image portion DG of the picked-up image so that the optical flows within the first image portion DG can be acquired. The other vehicle running adjacently to one's own vehicle approaches one's own vehicle at weak possibility. Therefore, it is difficult to detect the optical flows on the second image portion CG which is an image in the vicinity of one's own vehicle. In order to obviate such an inconvenience, the optical flows are detected on only the first image portion DG. Thus, the image processing for the second image portion CG can be omitted so that the processing speed of the CPU 4a can be increased.

Where the acquired optical flows converge on the FOE, it means that the other vehicle running on the adjacent lane or the following vehicle on the same lane runs at a lower speed than one's own vehicle. Namely, the other vehicle is leaving one's own vehicle. Inversely, where the acquired optical flows diverge from the FOE, the other vehicle approaches one's own vehicle.

All the optical flows produced by the scene and mark on the road on the first image portion DG converge on the FOE and hence can be easily discriminated from the approaching adjacent or following vehicle. The length of the optical flow produced from the adjacent or following vehicle is proportional to the relative speed of one's own vehicle to the other adjacent or following vehicle. Therefore, when the length of the optical flow diverging from the FOE exceeds a prescribed length, it is decided that the other vehicle is abruptly approaching one's own vehicle. In order to inform the driver of this fact, a warning that there is an approaching vehicle is issued by sound from the speaker 6b. Otherwise, an indication that the other vehicle is approaching is made on the display section 6a.

On the other hand, when a reversing signal S2 is issued from a vehicle reversing detecting sensor to the microcomputer 4, the CPU 4a displays only the second image portion CG in the vicinity of one's own vehicle of the image picked up by the camera 1. Therefore, without displaying the first image portion which is not required to be confirmed when the vehicle is reversed, the visibility can be improved. Further, since the image picked up by the camera 1 is automatically displayed by the display section 6a when one's own vehicle is reversed, the user (driver) is not required to turn on/off the display section 6a through a manual switch. Thus, the user can save the labor of turning on/off the manual switch.

As described above, when one's own vehicle runs forward, by detecting the optical flows on the image picked up by the camera to detect the other vehicle approaching one's own vehicle, the rear monitoring is made. On the other hand, when one's own vehicle runs backwards, by confirming the image in the vicinity of the vehicle enlarged by the prism 2 on the display section 6b, the rear monitoring can be made. Thus, without using two cameras and moving the camera, the rear monitoring can be made compatible at low cost in both when the vehicle runs forward and backward.

Further, since the lower portion of the rage which can be picked up by the camera can be enlarged through the prism 2, the resolution of the first image portion GD will not be reduced. Further, since the second image portion CG can be used which are the other purposes (the rear monitoring during the reversing of the vehicle and setting the FOE) than detection of the optical flows, the image in the vicinity of the vehicle can be picked up without impeding the detection of the optical flows occurring from the vehicle approaching from a far distance and used for the other purpose than detection of the optical flows.

Figure 8:
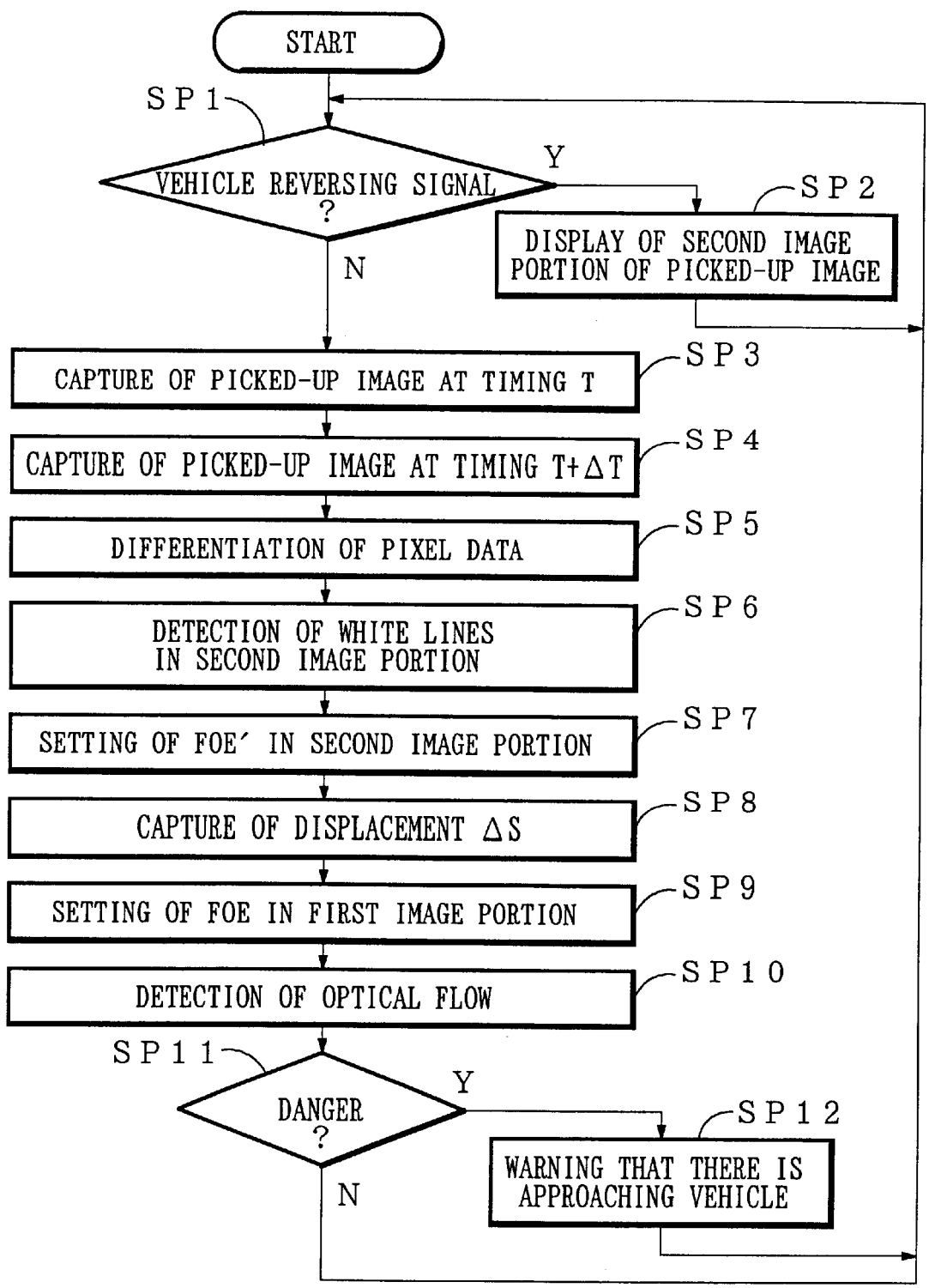
FIG. 8 is a flowchart showing the processing procedure of a CPU constituting a rear monitoring system according to the present invention.
Figure 9A:
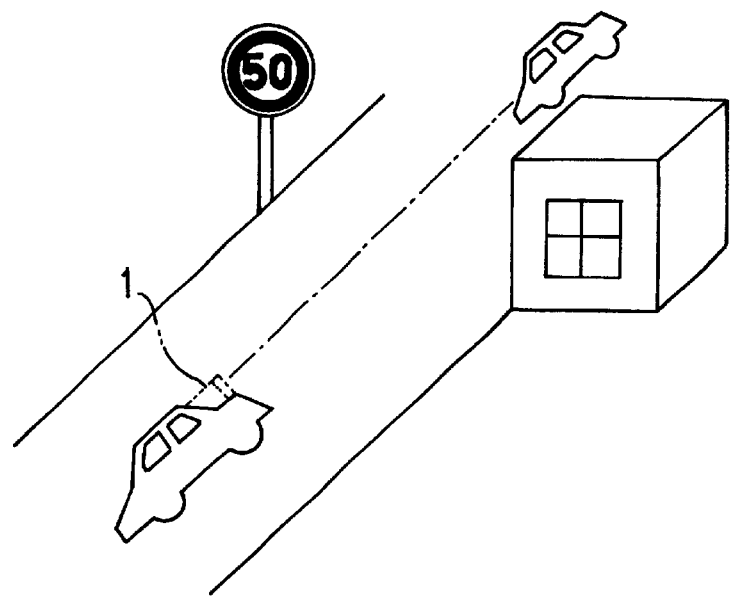
FIGS. 9A–9D are views for explaining a change in the rear image taken by a camera.
Figure 9B:
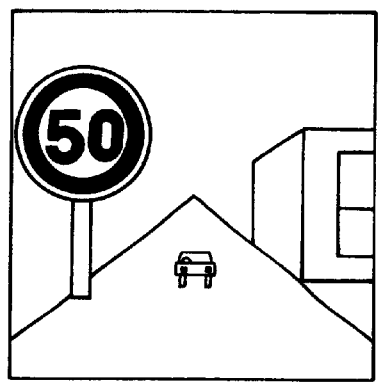
Figure 9C:
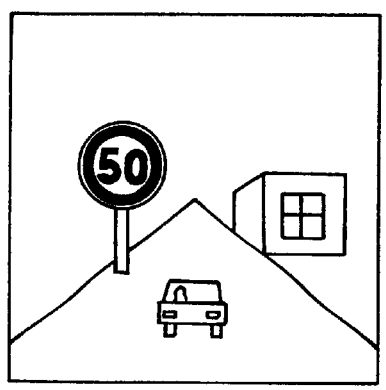
Figure 9D:
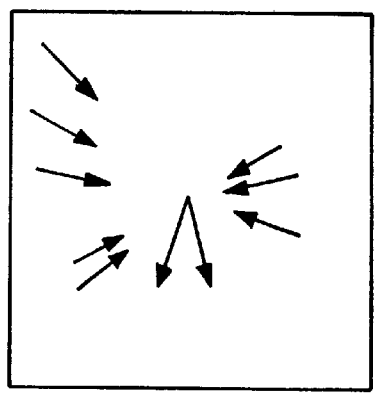

Referring to the flowchart showing the processing operation of the CPU 4a in FIG. 8, a detailed explanation will be given of the operation of the rear monitoring apparatus for a vehicle.

First, if a vehicle reversing signal S1 is issued from the reversing gear detecting sensor 5 ("Y" in step SP1), under the decision that the vehicle is reversed, the second image portion CG is displayed on the display section 6a (step SP2).

If the vehicle reversing signal S1 is not issued ("N" in step SP1), under the decision that the vehicle is running forward or still before starting, the picked-up image data D1 at timing t as shown in FIG. 4 is captured from the camera 1 to provide the pixel data D2 to be stored in the first frame memory 2a (step SP3).

Each picked-up image data D1 at timing t+Δt is captured to provide the pixel data D3 to be stored in the second frame memory 2b (step SP4). The pixel data D2 and D3 are differentiated to provide the corresponding differentiated images (step SP5). The white lines on both sides of the lane on which one's own vehicle runs are detected (step SP6). Next, the crossing point of the extended lines of the white lines within the detected image portion CG is set as FOE' (step SP7)

The displacement ΔS stored in the ROM 4b is captured (step SP8), and the FOE' set at step SP8 is shifted by the displacement ΔS to set FOE (step SP9). Next, in order to detect the danger degree of the other vehicle running on the adjacent lane or following one's own vehicle on the same lane, the optical flows within the first image portion DG are detected (step SP10). If the acquired optical flows are in the direction of diverging from the FOE and have a length exceeding a prescribed length ("Y" in step SP11), a decision is made that the other vehicle is approaching one's own vehicle. In this case, the warning that there is an approaching vehicle is issued by sound from the speaker 6b and the exhibition indicative of abrupt approaching of the other vehicle is made on the display section 6a. Thereafter, the processing returns to step SP1. If the optical flows are in the direction of converging into the FOE or they have a length not exceeding the prescribed length in the diverging direction, a decision is made that there is no approaching vehicle ("N" in step SP11). The processing directly returns to step SP1.

In the above embodiment, the set FOE' is shifted by the displacement ΔS previously stored in the ROM 4b in order to set the FOE, thereby increasing the processing speed of the CPU 4a. If there is no need of increasing the processing speed of the CPU 4a, a displacement angle is computed between the white lines within the second image portion CG and those within the first image portion DG which are determined by the position of attaching the camera and the shape of the lens. The crossing point of the extended lines of the white lines on the second image portion CG when they are shifted by the displacement angle may be defined as FOE.

In the above embodiment, the prism 2, which includes the upper portion 2a having a uniform thickness and the lower portion having a thickness becoming larger downward with a constant prism apex so that a change in the refractive index of the light incident from the upper portion 2a and 2b of the prism 2 is decreased, thereby reducing the blind spot at the boundary between the upper portion 2a and the lower portion 2b of the prism 2. However, the prism 2 may be configured so that the prism apex of the upper portion 2a continuously increases downward, thereby continuously changing the refractive index of the optical axis of the light incident from the upper portion 2a and the lower portion 2b. This permits the blind spot to be further reduced.

What is claimed is:

1. A rear monitoring apparatus for a vehicle comprising:
    an image pick-up means, loaded on a vehicle, for picking up a rear of the vehicle to provide an image;
    means for detecting, as an optical flow, movement of the corresponding points of two images picked up at two timings by the image pick-up means;
    danger judging means for detecting the other vehicle approaching one's own vehicle running in the vicinity of one's own vehicle on the basis of optical flows from the other vehicle;
    an image pick-up enlarging means for enlarging a lower portion of a range which can be picked up by the image pick-up means; and
    usage means for using the image corresponding to the lower portion for a different purpose from detection of the optical flows.

2. A rear monitoring apparatus for a vehicle according to claim 1, wherein the usage means includes a display means for displaying the image picked up by the image pick-up means.

3. A rear monitoring apparatus for a vehicle according to claim 1, further comprising vehicle reversing detecting means for detecting reversing of one's own vehicle, and
    the display means displays the image picked up by the image pick-up means when reversing of the vehicle is detected by the vehicle reversing detecting means.

4. A rear monitoring apparatus for a vehicle according to claim 1, wherein the optical flow detecting means detects the optical flows when reversing of the vehicle is not detected by the vehicle reversing detecting means.

5. A rear monitoring apparatus for a vehicle according to claim 1, wherein the image obtained by the image pick-up means is composed of a first image portion corresponding to an upper part of the range which can be picked up by the image pick-up means and a second image portion corresponding to a lower portion thereof which is enlarged by the image pick-up enlarging means, and
    the display means displays only the second image portion.

6. A rear monitoring apparatus for a vehicle according to claim 1, wherein the image obtained by the image pick-up means is composed of a first image portion corresponding to an upper part of the range which can be picked up by the image pick-up means and a second image portion corresponding to a lower portion thereof which is enlarged by the image pick-up enlarging means, and
    the optical flow detecting means detects the optical flows from the first image portion.

7. A rear monitoring apparatus for a vehicle according to claim 1, wherein the usage portion comprises:
    white line detecting means for detecting a pair of white lines located on both sides of one's own vehicle by processing the first image portion,
    a lower FOE (focus of extension) setting means for setting a crossing point of extended lines of the white lines detected by the white line detecting means as a second FOE (focus of extension) of the second image portion, and
    an upper FOE setting means for setting a first FOE of the second image portion on the basis of the second image portion, and
    the optical flow detecting means detects the optical flows from the first image portion by using the first FOE set by the upper FOE setting means.

8. A rear monitoring apparatus according to claim 7, wherein the upper FOE setting means has means for storing a displacement between the first FOE and the second FOE, and sets the second FOE by shifting the first FOE by the displacement.

9. A rear monitoring apparatus for a vehicle according to claim 1, wherein the image pick-up range enlarging means is a prism which includes a lower portion which becomes thick downward so that the lower portion of the range which can be picked up by the image pick-up means is enlarged, and an upper portion integral to the lower portion and having a uniform thickness.

* * * * *